No. 686,322. Patented Nov. 12, 1901.
J. F. McANANY.
PROCESS OF PRESERVING FOODS.
(Application filed Mar. 1, 1901.)
(No Model.) 2 Sheets—Sheet 1.
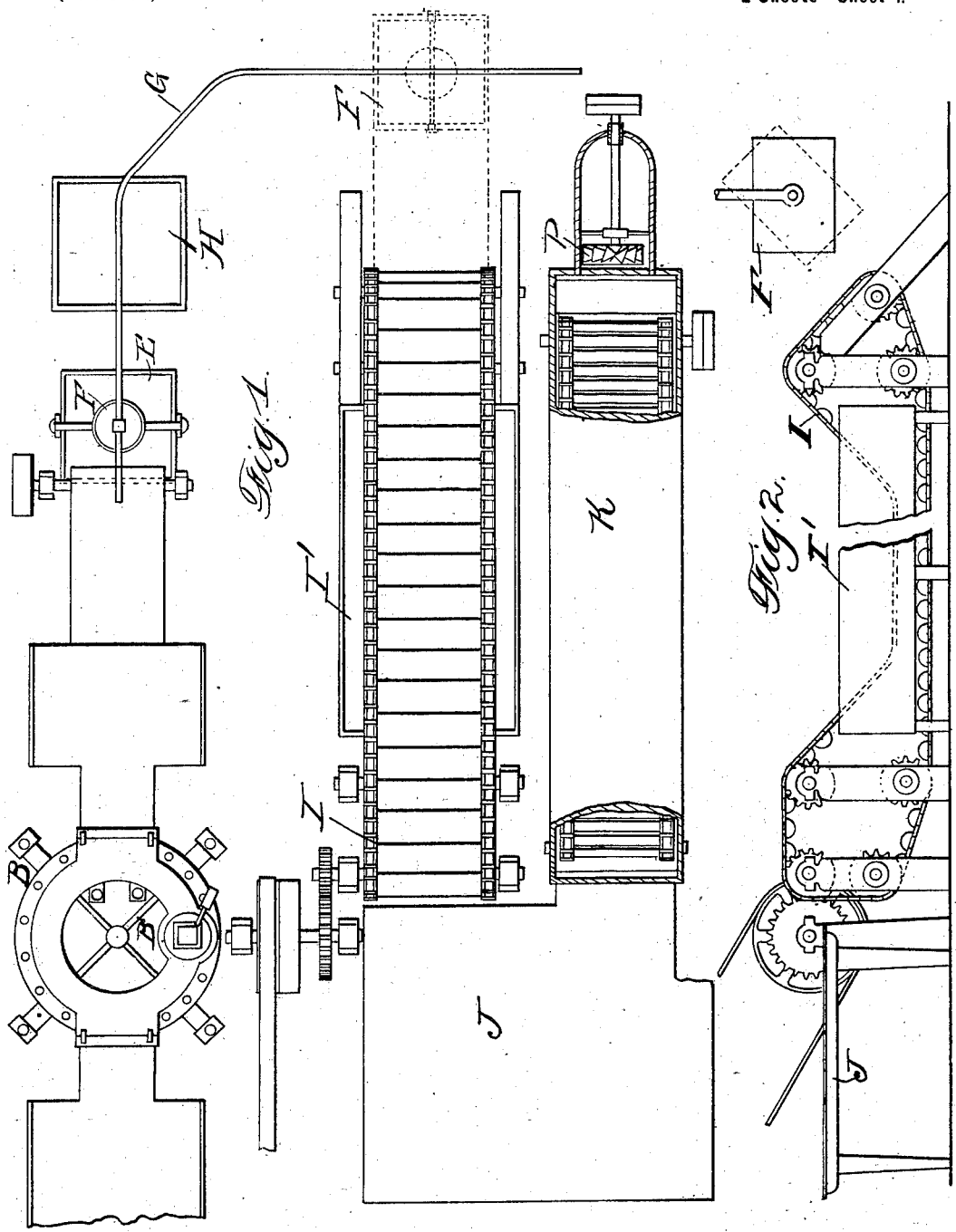

No. 686,322. Patented Nov. 12, 1901.
J. F. McANANY.
PROCESS OF PRESERVING FOODS.
(Application filed Mar. 1, 1901.)
(No Model.) 2 Sheets—Sheet 2.
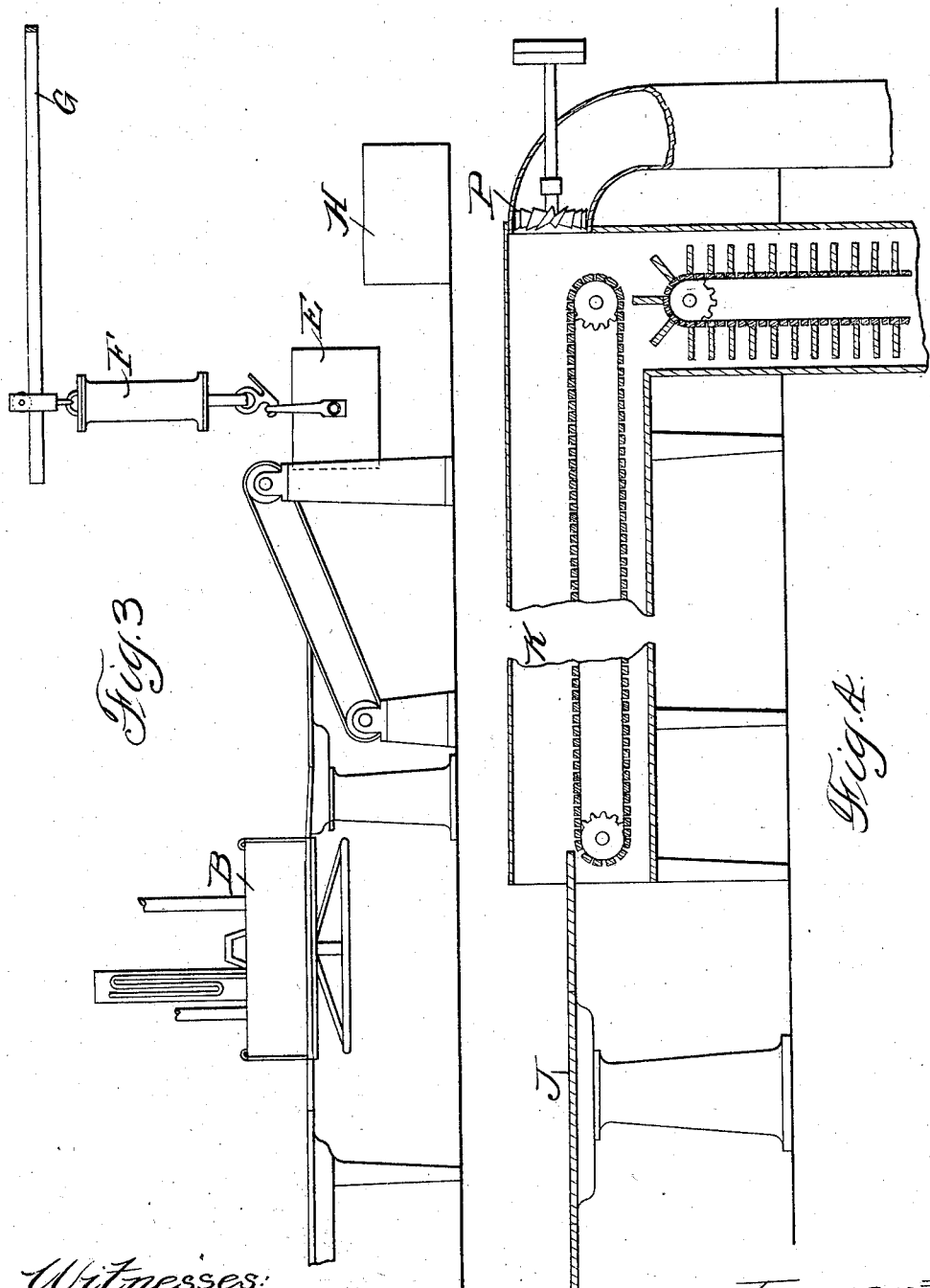

UNITED STATES PATENT OFFICE.

JOHN F. McANANY, OF KANSAS CITY, MISSOURI, ASSIGNOR TO CUDAHY PACKING COMPANY, OF CHICAGO, ILLINOIS, A CORPORATION OF ILLINOIS.

PROCESS OF PRESERVING FOODS.

SPECIFICATION forming part of Letters Patent No. 686,322, dated November 12, 1901.

Application filed March 1, 1901. Serial No. 49,378. (No specimens.)

*To all whom it may concern:*

Be it known that I, JOHN F. McANANY, a citizen of the United States, residing at Kansas City, in the county of Jackson and State of Missouri, have invented a certain new and useful Improvement in Processes for Treating Food Products, (Case No. 1,) of which the following is a full, clear, concise, and exact description, reference being had to the accompanying drawings, forming a part of this specification.

My invention relates to a process for treating food products, and has for its object a more efficient, economical, and perfect treatment of food products to secure their preservation.

As is well known, to insure the preservation of food products it is necessary to sterilize the product itself and to seal it hermetically in a vessel the interior of which is thoroughly sterile.

In the process which has been heretofore practiced for the purpose of preserving food products, and particularly meats, the following general steps have been employed. In describing the process as applied to meat it will be understood that meat is not the only food product which is capable of the treatment described. In general in speaking of "meat" throughout this specification I have in mind various classes of food products which may be subjected to the same treatment. After the meat was thoroughly cooked in the process heretofore employed it has been packed in cans. In order to provide for the subsequent shrinkage of the meat, it has been necessary in putting meat in cans to provide a surplus amount. For example, in two-pound cans when the meat is first packed it has been necessary to provide a gross weight of thirty-three ounces or a little more—that is to say, counting that in a two-pound can of meat there would be actually twenty-five ounces net weight of the meat in the completed product it would be necessary to put into the can twenty-six and one-quarter or twenty-six and one-half ounces of meat to provide for the waste which occurred during the treatment which the can received. After the meat was packed in the vessels the vessels were sealed with the exception of a small hole called a "vent," which was left to permit the escape of the contained gas which would be expanded and to some extent driven off during the treatment. In this condition the can would be subjected for possibly an hour to a cooking process. This cooking process was generally carried out in retorts by the application of steam. After this cooking process, during which the gases and to a considerable extent the liquid contained in the can would be driven off through the vent-hole, has been carried on to the desired point the can, with its contents, would be withdrawn from the cooking-chamber and while still hot and with a large portion of the gaseous contents driven off would be hastily sealed. During this preliminary cooking process and prior to the complete and final sealing of the can there would be a loss of from one to one and one-half ounces in twenty-five ounces of the contents of the can. This loss would be largely of the most nutritive part of the meat. After the can was finally sealed it was subjected to a final cooking process at a some-what higher degree of temperature and for a longer time and then finally had to be cleaned and cooled preparatory to receiving the label. In carrying out this process there were several disadvantages.

First. There was the loss in weight of the meat escaped through the vent during the cooking process. This loss was not only considerable in amount, but was a waste of the most valuable properties of the meat.

Second. The loss of moisture in the contents of the can made it impossible to treat the meat by a very high degree of temperature, because on account of the dryness of the meat due to the loss of moisture a high temperature would cause scorching, which would greatly impair the flavor and looks of the meat.

Third. By the old process it was essential that before the meat was put into the cans at all it should be cooked thoroughly, as otherwise, due to the shrinkage which would occur during the old process by which the moisture was driven out, unless the meat was thoroughly cooked in advance and in that manner reduced in bulk it would after being packed become loose and shake about in the can. The shrinkage due to the preliminary cooking before the meat is packed in cans under the old process would amount to about forty-five per cent. of the bulk of the meat. Under the process of my invention the cooking preliminary to the packing does not have to be carried on to an extent that will cause a shrinkage of more than twenty-five per cent. in bulk, which is a saving both in the heating required for the preliminary cooking and in the product as well.

Fourth. In the former process the cans had to be subjected to a double process—that is, the first cooking, during which the can was not completely sealed, and the final cooking after the gases and liquids had passed off due to the first heating. This required a great deal of handling.

Fifth. In the former process it was not possible to secure a complete exhaustion of the air in the can.

Sixth. In the process formerly employed the venting of the can during the process of cooking caused the grease and moisture from the interior of the can to be thrown about and prevented the possibility of the cleanliness which is most desirable in the treatment of food products. This lack of cleanliness also involved a considerable expenditure of labor and material in an attempt to keep the apparatus used in carrying out the process and the surroundings clean.

Seventh. Due to the fact that high temperature could not be employed with the process formerly used and to the further fact that an interruption in the process of cooking was necessary in order to allow the sealing of the cans the process took a long time to produce that perfect sterilization of the meat which is necessary for its preservation.

By means of the process of my invention I secure a more complete and thorough sterilization of the meat than was possible under the old process and at a great saving of time and labor. I avoid altogether the waste which occurred under the old process after the meat was packed in cans, and thus preserve the nutritive value of the meat and prevent its impairment in value and appearance. Instead of interrupting the cooking process to seal the can I have the can sealed before it is subjected to the cooking process, and thereafter the process becomes a continuous one until the can is ready for the label. I am thus able to avoid the frequent handling of the cans which was necessary in carrying out the old process. By means of my process, also, in which the juices of the meat are all preserved, the thorough cooking of the meat prior to packing is not necessary. I am thus able to save very largely on the shrinkage of the meat in the process preliminary to the packing of the meat in cans, and this further saves in the nutritive value of the meat and in its flavor.

My invention will be more clearly understood by the following description which is made, having reference to the accompanying drawings, in which—

Figure 1 represents apparatus by which the process of my invention is carried out, the entire apparatus being shown in plan view. Fig. 2 shows the cleansing-tank. Fig. 3 shows the vacuum-chamber and the cooking-tank in elevation; and Fig. 4, the wind-trunk, through which the cans are finally carried to effect their cooling.

Like letters of reference are used to indicate similar parts in the different figures.

In preparing the meat for my process I preferably have the meat cut into pieces of uniform size as nearly as practicable. This "grading" of the meat, as it is called, makes it possible to save on the time of curing the meat, as the meat when graded prior to its cooking does not have to be cured so thoroughly. After the meat is given this preliminary cooking, which reduces its bulk, say, twenty-five per cent., the meat is then cut into proper sizes for packing in cans and the cans are filled with the meat, preferably by machinery. During the packing of the cans or immediately after I add for each twenty-four ounces of meat one ounce of water. The meat thus has lost less of its substance during the preliminary cooking than it would have lost as treated under the prior process and in addition there is added to it an ounce of water. The can is then covered, with the exception of a small vent-hole, and the can is passed into a vacuum-chamber B and brought under the glass B', where it can be seen and where the vent-hole can be soldered by means of an electric soldering-iron. I do not show in detail this mechanism, as the mechanism for accomplishing this purpose does not constitute a part of my invention. Prior to the sealing of the vent there has been exhausted from the can substantially all the gaseous contents, but none of the fluid or solid contents. The can is then taken from the vacuum-chamber and by means of a conveyer delivered to the basket E, which is hung upon the overhead rail G, by means of the air-hoist F. The basket E is when filled with the cans of meat carried to the tank H, in which there is a liquid which is preferably kept at a high temperature—say 250° or upward. For this purpose some oil, such as lard or tallow, may be used or other liquid which does not vaporize at the temperature which it is desired to use. It will be understood that other means for cooking may be employed than the one here shown. After the cans have been subjected to the cooking process in the tank H for a sufficient length of time, varying in time from half an hour to whatever time is required to complete the process of sterilizing the contents of the cans, (and this will depend upon the size of the can and the nature of the contents,) the basket E is carried upon the overhead rail G to the conveyer I, upon which the cans are delivered from the basket. The conveyer I, carrying the cans, which fit into recesses provided thereon, passes through the cleansing-bath I', which effectually removes any grease that may remain adherent to the cans. The cans are thus automatically delivered to the table J in a cleansed condition and then after being cooled in any desired way—as, for instance, by passing through the wind-trunk K by means of a conveyer against a blast of cold air delivered by the blower P—are carried to the labeling-table. I do not claim the cleansing and cooling steps as part of my present invention.

I believe it is broadly new with me to provide a process for the treatment of food products in which instead of losing any bulk during the process the contents of the can are preserved from any loss whatever and in this way their nutritive value, flavor, and appearance are preserved from impairment.

I claim—

1. The herein-described process of preserving food products, which consists in packing the same in cans, adding water thereto, sealing the cans *in vacuo*, while the vacuum is maintained and then cooking the cans with their contents thus sealed.

2. The herein-described process of preserving food products, which consists in packing the same in cans, adding water thereto, sealing the cans *in vacuo*, while the vacuum is maintained and then cooking the cans with their contents thus sealed, at a high temperature.

3. The herein-described process of preserving food products, which consists in packing the same in cans, adding water thereto, sealing the cans by soldering *in vacuo*, and then cooking the cans with their contents thus sealed.

4. The herein-described process of preserving food products, which consists in packing the same in cans, adding water thereto, sealing the cans by soldering *in vacuo*, and then cooking the cans with their contents thus sealed, at a high temperature.

5. The herein-described process of preserving food products, which consists in packing the same in cans, adding water thereto, sealing the cans *in vacuo* while the vacuum is maintained, and then cooking the cans with their contents thus sealed in a liquid at a high temperature.

In witness whereof I hereunto subscribe my name this 15th day of February, A. D. 1901.

JOHN F. McANANY.

Witnesses:
 HERBERT F. OBERGFELL,
 HARVEY L. HANSON.